Nov. 1, 1955  N. BENEDETTI  2,722,076
FLASHLIGHT CONSTRUCTION
Filed April 20, 1953
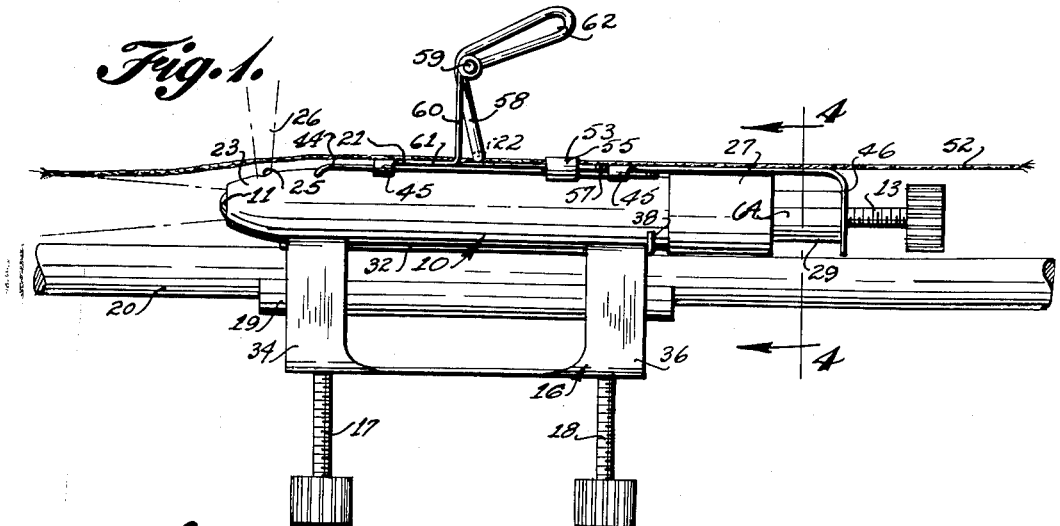
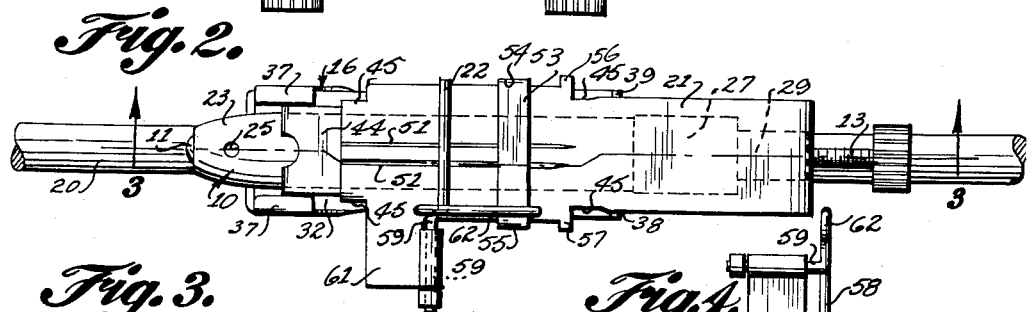
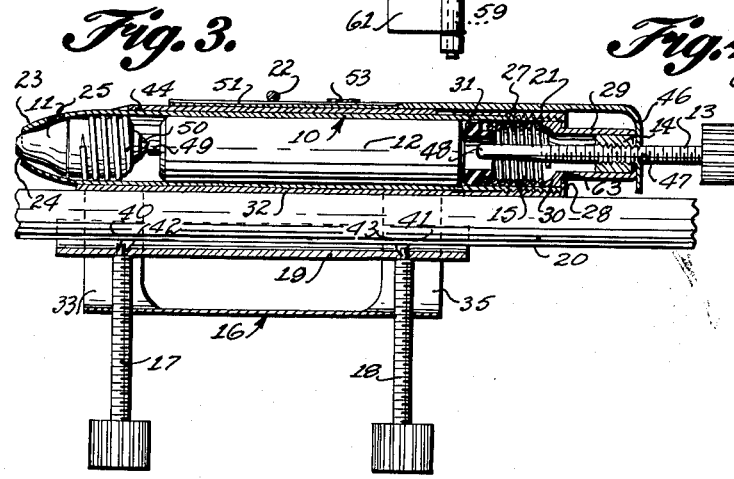
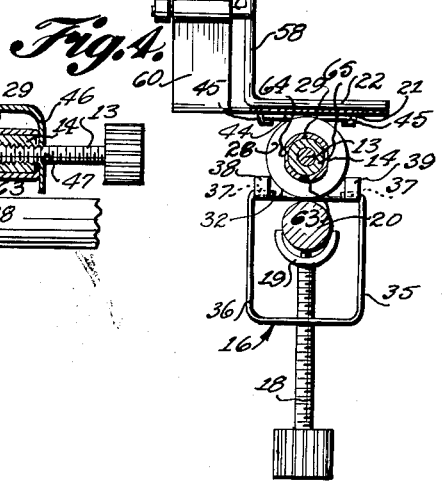
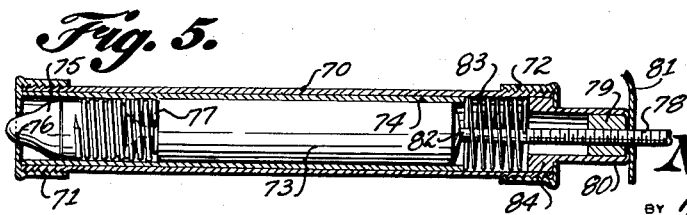
INVENTOR.
*Nello Benedetti.*
BY *Victor J. Evans & Co.*
ATTORNEYS United States Patent Office 2,722,076
Patented Nov. 1, 1955

2,722,076

FLASHLIGHT CONSTRUCTION

Nello Benedetti, Charleroi, Pa.

Application April 20, 1953, Serial No. 349,607

2 Claims. (Cl. 43—17)

This invention relates to strike indicating devices adapted to be used on fishing rods, and in particular a mounting for a flashlight whereby with the flashlight clamped on a fishing rod the pull of a fish on a line lights the light.

The purpose of this invention is to facilitate night fishing by providing a light on a fishing rod and means actuated by a fish striking a line for lighting the light.

Various devices have been provided for actuating indicating means when a fish strikes a line, however, it has been found difficult to provide a device that is adapted to be mounted directly on a fishing rod in which the position of a line in the device is readily adjustable.

With this thought in mind this invention contemplates a flashlight casing mounted on a clamp adapted to be positioned on a fishing rod and a line gripping finger slidably mounted on the body of the flashlight and positioned to grip a line extended across the light housing.

The object of this invention is, therefore, to provide means for clamping a flashlight on a fishing rod whereby a fishing line threaded through the device is gripped after making a cast and wherein a pull on the line actuates means for completing a circuit to a light bulb in the casing of the flashlight.

Another object of the invention is to provide a fishing line flashlight that is adapted to be temporarily clamped to a fishing rod and that is adapted to grip a fishing line extended longitudinally along the upper surface thereof.

A further object of the invention is to provide a flashlight for use on a fishing rod with means for completing a circuit to a light bulb therein upon striking of a bait on a line extended therethrough by a fish in which the device is of a simple and economical construction.

With these and other objects and advantages in view the invention embodies a tubular casing having a tapering forward end in which a light bulb is positioned, a battery slidably mounted in the casing, an adjusting screw threaded in a bushing slidably mounted in the casing, a clamp extended from one side of the casing for securing the device on a fishing rod and a line gripping finger pivotally mounted on a plate slidably mounted on the casing and having an end extended for moving the adjusting screw into the casing, compressing a spring in the casing, and sliding the battery whereby a terminal thereof contacts a terminal of the light bulb to complete a circuit to the light bulb.

Other features and advantages of the invention will appear from the following description taken in connection with the drawing, wherein:

Figure 1 is a side elevational view illustrating the improved flashlight mounting and showing the device positioned on a fishing rod, the ends of which are broken away.

Figure 2 is a plan view of the mounting shown in Fig. 1.

Figure 3 is a longitudinal section through the flashlight mounting taken on line 3—3 of Fig. 2.

Figure 4 is a cross section through the mounting taken on line 4—4 of Fig. 1.

Figure 5 is a longitudinal section, similar to that shown in Fig. 3 illustrating a modification wherein the flashlight is provided with a plastic insulating casing and springs are positioned at both ends of the casing.

Referring now to the drawing wherein like reference characters denote corresponding parts the improved flashlight mounting of this invention includes a tubular casing 10, a light bulb 11 positioned in the casing, a battery 12 slidably mounted in the casing, an adjusting screw 13 threaded in a bushing 14 and extended into the casing, a spring 15 for urging the bushing and screw outward to break a circuit to the light bulb, a clamp 16 having adjusting screws 17 and 18 threaded in the ends thereof and positioned to urge a cradle 19 against the fishing rod, which is indicated by the numeral 20, and a plate 21 slidably mounted on the tubular casing and having a finger 22 pivotally mounted thereon and positioned to grip a fishing line extended longitudinally over the casing.

The casing 10 is provided with a tapering outer end 23 and the tapering end is provided with an opening 24 through which the tip of the light bulb extends, as shown in Fig. 3, and also an opening 25 that is positioned to throw rays of light, as indicated by the numeral 26 upwardly so that the light is visible to a fisherman beyond the end of the fishing rod. The opposite end of the casing 10 is provided with a sleeve or cap 27 which is crimped or otherwise secured to the outer surface of the casing and the extended end of the sleeve is provided with an inwardly extended annular flange 28 through which a tube 29 in which the bushing 14 is carried extends. The tube 29 is provided with an enlarged inner end 30 and one end of the spring 15 bears against the end 30 of the tube. The opposite end of the spring is mounted on a washer 31 through which the end of the adjusting screw 13 extends, as shown in Fig. 3.

The tubular casing 10 is provided with a base plate 32 which, with the device mounted upon a fishing rod, rests against one side of the rod and the plate with the casing thereon is secured in position on the rod by the clamp 16 with the adjusting screws 17 and 18 and cradle 19.

The clamp 16 is provided with U-shaped sections at the ends with arms 33 and 34 at one end and 35 and 36 at the other and, as illustrated in Fig. 4, the ends of the arms of the clamp are provided with flanges, as indicated by the numeral 37 which extend over the edges of the plate 32. The inner end of the plate 32 is provided with upwardly extended tabs 38 and 39 that prevent accidental displacement of the clamp from the plate.

The cradle 19, which is substantially semi-circular in cross section, is provided with openings 40 and 41 into which pins 42 and 43 on the ends of the adjusting screws 17 and 18 extend and with the cradle mounted in this manner it is forced against the side of the fishing rod opposite to that against which the plate 32 is positioned.

A plate 44, somewhat similar to the plate 32 is also positioned on the upper side of the casing 10 and secured thereto and the plate 21 is provided with hook-like projections 45 that extend over the edges of the plate 44 providing means for slidably mounting the plate 21 on the plate 44.

The plate 21 is also provided with an extension 46 which, as shown in Fig. 3, extends over the end of the tube 29 and the adjusting screw 13 is threaded through an opening 47 in the extension 46. By this means forward movement of the plate 21 moves the tube 29 with the adjusting screw 13 inwardly compressing the spring 15 whereby the point 48 of the screw 13 contacts the end of the battery 12, urging the terminal 49, at the opposite end into engagement with a terminal 50 of the light bulb 11.

The upper surface of the plate 21 is provided with longitudinally disposed grooves 51 which are positioned to receive a fishing line, as indicated by the numeral 52 and the line is retained in position on the plate with a cross bar 53, the ends 54 and 55 of which extend around the edges of the intermediate portion of the plate 21 providing lips for retaining the bar in position. The edges of the plate 21 are also provided with projections 56 and 57 which limit rearward movement of the bar 53.

The fishing line gripping finger 22 is carried by an arm 58 pivotally mounted by a pin 59 at the upper end of a vertically disposed plate 60 which extends from the edge of an extension 61 at one side of the plate 21. The upper end of the arm 58 is formed to provide a loop 62 which forms a counterweight for urging the finger 22 into engagement with a fishing line extended along the plate 21, the finger 22 gripping the fishing line and preventing outward movement thereof until the loop 62 is moved upwardly by hand.

By this means a fishing line, as indicated by the numeral 52 extended over the plate 21 is gripped by the finger 22 and a pull on the fishing line resulting from a fish striking bait on a hook thereof draws the plate 21 with the adjusting screw 13 and tube 29 forwardly whereby the point 48 of the screw contacts the battery 12 completing a circuit to the light bulb 11. The tube 29 slides inwardly through an opening 63 in the flange 28 and, as illustrated in Fig. 4 the tube and also the opening are provided with flat sides, as indicated by the numerals 64 and 65 to prevent the tube from rotating in the sleeve or cap 27.

In the modification illustrated in Fig. 5 wherein the tubular casing is formed of plastic material, the device is provided with a plastic tube 70 having caps 71 and 72 on the ends and a battery 73 is slidably mounted in an inner tube 74. In this design a light bulb 75 is positioned to extend through an opening 76 in the cap 71 and a spring 77 urges the battery away from the light bulb, separating the terminals of the bulb and battery. In this design an adjusting screw 78 threaded in a bushing 79 in a tube 80 is moved inwardly by a flange 81, similar to the flange 46 of the device shown in Fig. 3 and upon inward movement of the tube and adjusting screw the inner end 82 of the adjusting screw engages the battery 73 urging the terminal of the battery into engagement with the terminal of the light bulb 75 thereby completing a circuit to the bulb. Upon release of the fishing line a spring 83 positioned between an enlarged inner end 84 of the tube 80 and the end of the inner tube 74 urges the tube 80 and adjusting screw 78 outwardly, breaking the circuit to the light bulb 75. In this design the spring 77 urges the battery away from the light bulb and the spring 83 urges the tube 82 and adjusting screw 78 outwardly of the tubular plastic casing.

The tubular plastic casing 70 may be provided with upper and lower plates, similar to the plates 44 and 32 of the casing 10 and with these plates the device may be clamped to a fishing rod at one side and a fishing line may be held by a finger, similar to the finger 22 at the opposite side.

The flashlight mounting of this invention may be provided as a separate and independent unit and mounted upon a fishing rod by a fisherman, as desired.

It will be understood that modifications, within the scope of the appended claims, may be made in the design and arrangement of the parts without departing from the spirit of the invention.

What is claimed is:

1. A flashlight mounting comprising a tubular casing, a light bulb positioned in one end of the casing, said casing having an opening in the end in which the light bulb is positioned and also an opening in one side and said opening in one side being positioned to emit rays of light from the light bulb, a battery slidably mounted in the casing, a clamp on the casing for mounting the casing on a fishing rod, a plate slidably mounted on the casing, a crossbar extending transversely of said plate and having hooked ends thereon engaging said plate for retaining said crossbar on said plate and said crossbar extending over a fishing line on said plate, means for temporarily clamping the fishing line on said plate, and means actuating the battery by movement of the plate slidably mounted on the casing for completing a circuit to the light bulb upon sliding movement of the plate resulting from a force applied to the fishing line.

2. In a flashlight mounting as in claim 1, wherein a tube is slidably mounted in the end of the casing opposite to that in which the light bulb is positioned, an adjusting screw is threaded in and extended through said tube, a spring is positioned in the casing between the battery and tube for urging the tube to a position extended from the end of the casing, and said plate is provided with a flange positioned to engage the end of the tube.

References Cited in the file of this patent

UNITED STATES PATENTS

| 1,815,662 | Bacon | July 21, 1931 |
| 2,195,692 | Bushey | Apr. 2, 1940 |
| 2,201,588 | Kuhns | May 21, 1940 |
| 2,619,559 | Schenkel | Nov. 25, 1952 |

FOREIGN PATENTS

| 178,135 | Switzerland | Sept. 2, 1935 |